United States Patent
Roser

(10) Patent No.: US 7,627,813 B2
(45) Date of Patent: Dec. 1, 2009

(54) TESTING THE TYPE OF BROWSER USED TO VIEW WEBPAGES BY IMPLEMENTING DYNAMIC REFERENCE ELEMENTS FROM A SCRIPT

(75) Inventor: Genevieve Roser, Villiers sur Orge (FR)

(73) Assignee: Bull, S.A., Les Clayes Sous Bois (FR)

( * ) Notice: Subject to any disclaimer, the term of this patent is extended or adjusted under 35 U.S.C. 154(b) by 766 days.

(21) Appl. No.: 11/097,368

(22) Filed: Apr. 4, 2005

(65) Prior Publication Data
US 2005/0223029 A1  Oct. 6, 2005

(30) Foreign Application Priority Data
Apr. 5, 2004  (FR) .................... 04 03539

(51) Int. Cl.
*G06F 17/00* (2006.01)
(52) U.S. Cl. ............... 715/234; 717/124; 717/126
(58) Field of Classification Search ........ 715/205, 715/234, 760; 703/4–6; 717/111, 115, 124–127, 717/131, 134–135
See application file for complete search history.

(56) References Cited

U.S. PATENT DOCUMENTS

| | | | | |
|---|---|---|---|---|
| 6,023,714 A * | 2/2000 | Hill et al. | ............ | 715/235 |
| 6,044,398 A * | 3/2000 | Marullo et al. | ............ | 709/219 |
| 6,300,947 B1 * | 10/2001 | Kanevsky | ............ | 715/866 |
| 6,918,066 B2 * | 7/2005 | Dutta et al. | ............ | 714/46 |
| 2002/0073119 A1 | 6/2002 | Richard | | |
| 2002/0103856 A1 * | 8/2002 | Hewett et al. | ............ | 709/203 |
| 2003/0061283 A1 * | 3/2003 | Dutta et al. | ............ | 709/204 |
| 2004/0059809 A1 * | 3/2004 | Benedikt et al. | ............ | 709/224 |
| 2005/0182773 A1 * | 8/2005 | Feinsmith | ............ | 707/100 |
| 2005/0278698 A1 * | 12/2005 | Verco | ............ | 717/116 |
| 2006/0101404 A1 * | 5/2006 | Popp et al. | ............ | 717/124 |
| 2007/0150496 A1 * | 6/2007 | Feinsmith | ............ | 707/100 |

OTHER PUBLICATIONS

Goodman, D., Javascript & DHTML Cookbook, section 5, O'Reilly, Apr. 2003.*
DHTML Centering Script for DIV Tags, IBM TDB, issue 445, p. 874, May 1, 2001.*
Vitali F et al. "Extending HTML in a Principled Way with Displets" Computer Networks and ISDN Systems, North Holland Publishing. Amstrdam, NL, vol. 29, No. 8-13.

* cited by examiner

*Primary Examiner*—Cesar B Paula
(74) *Attorney, Agent, or Firm*—Miles & Stockbridge P.C.; Eric G. King

(57) ABSTRACT

This invention relates to a process for recognition and referencing of dynamic objects (22) in Internet pages (2) viewed by browsers (30) executed by users' computers (3), characterised in that it consists of a script (20) included in the Internet pages (2) containing dynamic elements (21) to be interpreted by all types of browsers (30) and to implement a step to test the type of browser (30) used to view the Internet page (2), so as to determine whether or not the following steps defined in the script (20) need to be implemented:
  automated routing (4) of Internet pages (2) and identification of dynamic elements (21);
  creation (5) of access references (25) to dynamic objects (22) corresponding to identified elements (21);
  instantiation (6) of dynamic objects (22) referenced within Internet pages (2) viewed by browsers (30).

26 Claims, 1 Drawing Sheet

TESTING THE TYPE OF BROWSER USED TO VIEW WEBPAGES BY IMPLEMENTING DYNAMIC REFERENCE ELEMENTS FROM A SCRIPT

BACKGROUND OF THE INVENTION

1. Field of the Invention

This invention relates to the domain of Internet browsing and particularly the recent use of dynamic objects within pages to be browsed.

2. Description of Related Art

Internet sites are composed of Internet pages written in languages adapted to Internet publication formats such as "HTML" (Hypertext Markup Language) or "XML" (Extensible Markup Language). These simple languages enable Internet site developers to define pages containing text and image fields to which they can assign properties (Markup). The different pages or fields in a page are linked to each other using a complex organization made using links (Hypertext). These Internet pages are viewed by users using software applications called browsers, capable of displaying these pages as they were designed on a user's computer. Recently, a new language was created to enable more functions within pages displayed by browsers. This language is called "DHTML" (Dynamic Hypertext Markup Language) and is used to integrate dynamic elements in Internet pages identified by tags within pages and defined by identifiers. After an Internet page has been downloaded from a server and displayed on the computer screen of a user who is viewing it, these dynamic elements are used to change the display with time and/or as a function of user's actions without any need for communication with a server. This special feature is possible due to the fact that these dynamic elements are characterised by the tag of each element, that reveals their nature. The browser uses the tag of each element to locate dynamic elements and references the corresponding objects using their identifier that provides a means of access to these identified objects. The identifier corresponds to an access reference to objects so that the browser can instantiate them, in other words create them and initialise them in accordance with parameters determined by the designer. This access reference to objects thus initialised enables execution of their specific functions called methods, and modification of their properties. When they are included in an Internet page, scripts executed within the software environment supplied by Internet browsers enable fast access to them due to this access reference. These scripts interpreted by browsers enable the execution of methods of these objects and dynamic modification of their display within the page.

In prior art, it is known that browsers enable the display of dynamic elements and execution of methods of dynamic objects to which they refer, but only for some given object types defined by browser designers. One important problem in this domain is that the different browser designers do not have the same view of implementations that should be made to the DHTML language. The result is that the different browsers do not support the same functions. A common standard is now being created but designers do not agree about objects to be implemented or the method of implementing them in their browsers. Some browsers enable access to dynamic objects when they are present in the page, since the browser automatically identifies them and interprets functions defined by these objects. Some browsers are also capable of interpreting the language of object method execution scripts, but they are incapable of identifying elements within Internet pages and therefore of referencing the corresponding objects.

Internet sites are known in prior art in which the use of dynamic elements has been abandoned so that users can access the same pages regardless of their browser. This solution has the disadvantage that sites thus designed do not have such an elegant appearance and are not as practical in use as those obtained with the current technology.

Internet sites in which pages are written with several different versions of programming code are also known in prior art, to enable access to different dynamic objects within pages, regardless of the browser used by the person viewing the Internet site. The server will send the appropriate type of page for the browser that requested downloading of a page. This solution introduces an implementation cost problem and a loss of time for Internet site designers that have to write all pages in several versions of programming code.

Prior art also includes processes enabling the use of dynamic objects regardless of the browser but which require that code lines specific to each dynamic element in the page containing dynamic elements should be included in each of the pages. These code lines define a variable initialised so as to contain a reference to the dynamic element concerned. Access to this reference when the page is being loaded enables all browser types to identify and use the corresponding dynamic object. This solution also makes it more difficult to develop Internet sites because it requires that code lines specific to each dynamic element contained in each page on the Internet site should be included, for the use of dynamic objects that are normally designed to avoid this type of systematic definition.

SUMMARY OF THE INVENTION

In this context, it is useful to propose a process for making known dynamic objects accessible due to the dynamic creation of access references to these objects, regardless of the browser used to display the Internet page containing dynamic elements that require the use of these dynamic objects.

The purpose of this invention is to overcome some disadvantages of prior art by proposing a process for recognition and referencing for access to dynamic objects in Internet browsing pages so that, if required by the browser used to view the Internet pages, the Internet pages can be browsed to identify the dynamic elements contained in them and to create an access reference enabling use of the dynamic objects to which they refer.

This purpose is achieved by a process for recognition and referencing of dynamic objects in Internet pages made available on the Internet network by at least one computer, called the page server, for viewing using at least one Internet browsing software tool called the browser, executed on the processing means of at least one user's computer, characterised in that it consists firstly of a script stored in the memory means of at least one computer called the script server, and secondly included in Internet pages containing dynamic elements, to be interpreted by all types of browsers when these pages are loaded by the user's computer, and to implement a step to test the type of browser used to view the Internet page, for each of the Internet pages viewed by the user's browser, so as to determine whether or not this browser requires implementation of the following steps defined in the script:

automated routing of the Internet page received by the user's computer and identification of the dynamic elements contained in it, according to the tags of a plurality of known dynamic elements stored in the user's computer memory means;

creation of an access reference to dynamic objects corresponding to identified dynamic elements, due to the user's browser interpreting a source code of the dynamic objects programming language, this source code being stored in the user's computer memory means;

processing of the Internet page by the user's browser and instantiation of the defined dynamic objects;

display of the Internet page by the user's browser with the dynamic objects contained on it due to display means and processing means of the user's computer.

According to another feature, the steps involved in automatic routing of the received Internet page and identification of the dynamic elements contained in it consist of the following steps:

creation and initialisation of a global variable for enumeration of dynamic elements contained in the Internet page;

search for marking tags and identifiers of dynamic elements contained in the page and comparison of the tags found with the plurality of known dynamic element tags stored in the user's computer memory means;

addition of names corresponding to identifiers of the dynamic elements found using the dynamic element marking tags in the Internet page, into the global enumeration variable;

execution of a method for the definition of access references to dynamic objects corresponding to dynamic elements referenced in the global enumeration variable, this method resulting in the creation of access references to dynamic objects recognised in the Internet page.

According to another feature, the step for definition of access references to dynamic objects corresponding to the identified elements is done by execution of a method for processing the enumeration variable of the identified dynamic elements, resulting in the creation of access references to the corresponding dynamic objects recognised as being objects defined in the source code of the dynamic objects programming language and interpretable by the browser of the user's computer when the Internet page is displayed.

According to another feature, the access references defined by interpretation of the script are then used for object programming due to their interpretation by users' browsers, using the source code of the dynamic objects programming language, execution of methods of these dynamic objects enabling the different dynamic functions for modification of the display of Internet pages that contain them, using the display means of the users computer without necessitating any communication with a page server computer.

According to another feature, the script is included in the Internet pages containing the dynamic elements, due to the processing means of the page server computer adding a universal resource locator (URL) into each of these pages, indicating the access path of a file corresponding to this script in the memory means of a script server computer.

According to another feature, the page server computer is also the script server computer and its memory means store firstly the file corresponding to the script for recognition and referencing of dynamic objects in the Internet pages, and secondly files corresponding to the Internet pages in which this script is to be included, the script inclusion step consisting of using the processing means of this page server and script server computer to add a URL indicating the access path of a file corresponding to this script in its own memory means.

According to another feature, the page server computer is a computer other than the script server computer and the script is included into the Internet pages when a user's browser makes a request to view an Internet page containing dynamic elements, according to the following steps:

the page server computer sends an access request to the file corresponding to the script in the memory means of the script server computer, to the script server computer through the Internet network, authorisation to access the file corresponding to the script due to access authorisation means of the script server computer, this file is then sent by the script server computer to the page server computer through the Internet network;

reception of the file by the page server computer, inclusion of the script in the Internet page requested for viewing by the user's browser, and the Internet page is then sent through the Internet network together with the script to the user's computer.

According to another feature, the page server computer is a computer other than the script server computer and the script is included in the Internet pages when a user's browser makes a viewing request to view an Internet page containing dynamic elements, according to the following steps:

the page server computer sends the Internet page in which the script is to be included through the Internet network to the script server computer;

the script server computer receives the page sent by the page server computer and includes the script in the Internet page due to processing means of the script server computer, and then sends the Internet page together with the script to the page server computer through the Internet network;

the page server computer sends the Internet page together with the script to the user's computer, through the Internet network.

Another purpose of the invention is to propose a dynamic objects recognition and referencing system in Internet pages enabling the user browsers to recognise and reference dynamic objects corresponding to dynamic elements present in Internet pages, even when the user's browser does not manage direct referencing of dynamic objects due their identifier.

This purpose is achieved by a dynamic objects recognition and referencing system in Internet pages received by a browser executed by a user's computer, even the user's browser does not manage automatic access to dynamic objects, this system comprising at least one script server computer, at least one page server computer and at least one user's computer, these computers all including memory means, processing means and communication means through the Internet network, characterised in that the page server computer and the script server computer also comprise access authorisation means to the contents of their memory means, the memory means enabling firstly the page server computer to store files corresponding to Internet pages among which some contain dynamic elements and secondly enable the script server computer to store a script to be included in Internet pages for recognition and referencing of dynamic objects contained in it, access authorisation means enabling firstly the page server computer to make Internet pages stored in its memory means available on the Internet network for viewing by browsers executed on processing means of user computers, and secondly enabling the script server computer to make the script stored in its memory means available for inclusion in Internet pages containing dynamic elements, before sending these pages to users' browsers.

According to another feature, the memory means of the user's computer store the source code of the dynamic objects programming language and temporarily store the Internet pages received through the Internet network from the page server computer, and its processing means are used to execute the browser to view Internet pages and to interpret the script included in some of these pages, through the browser using the source code of the dynamic objects programming language.

According to another feature, the page server computer is also the script server computer and its memory means store firstly the file corresponding to the script that enables recognition and referencing of dynamic objects in Internet pages to enable access by all types of browsers to these objects, and secondly files corresponding to Internet pages in which this script is to be included, its means of authorising access to the contents of its memory means firstly making it possible to make Internet pages corresponding to files stored in its memory means on the Internet network, and secondly to make the script stored in its memory means available so that it can be included in the Internet pages due to its processing means, by adding a URL indicating the access path to the file corresponding to this script in its memory means.

According to another feature, the page server computer is a computer other than the script server computer and inclusion of the script in the Internet pages containing the dynamic elements requires firstly communication between these computers using their Internet communication means, and secondly addition into some Internet pages of the URL indicating the access path to the file corresponding to this script in the memory means of the script server computer, using the processing means of the page server computer or the processing means of the script server computer.

BRIEF DESCRIPTION OF THE DRAWINGS

Other features and advantages of this invention will become clearer after reading the following description with reference to FIG. 1 that represents a diagram of the process according to one embodiment of the invention as it is used by the system composed of a page and script server computer, and a user's computer.

DETAILED DESCRIPTION OF THE PREFERRED EMBODIMENTS

Figure 1:
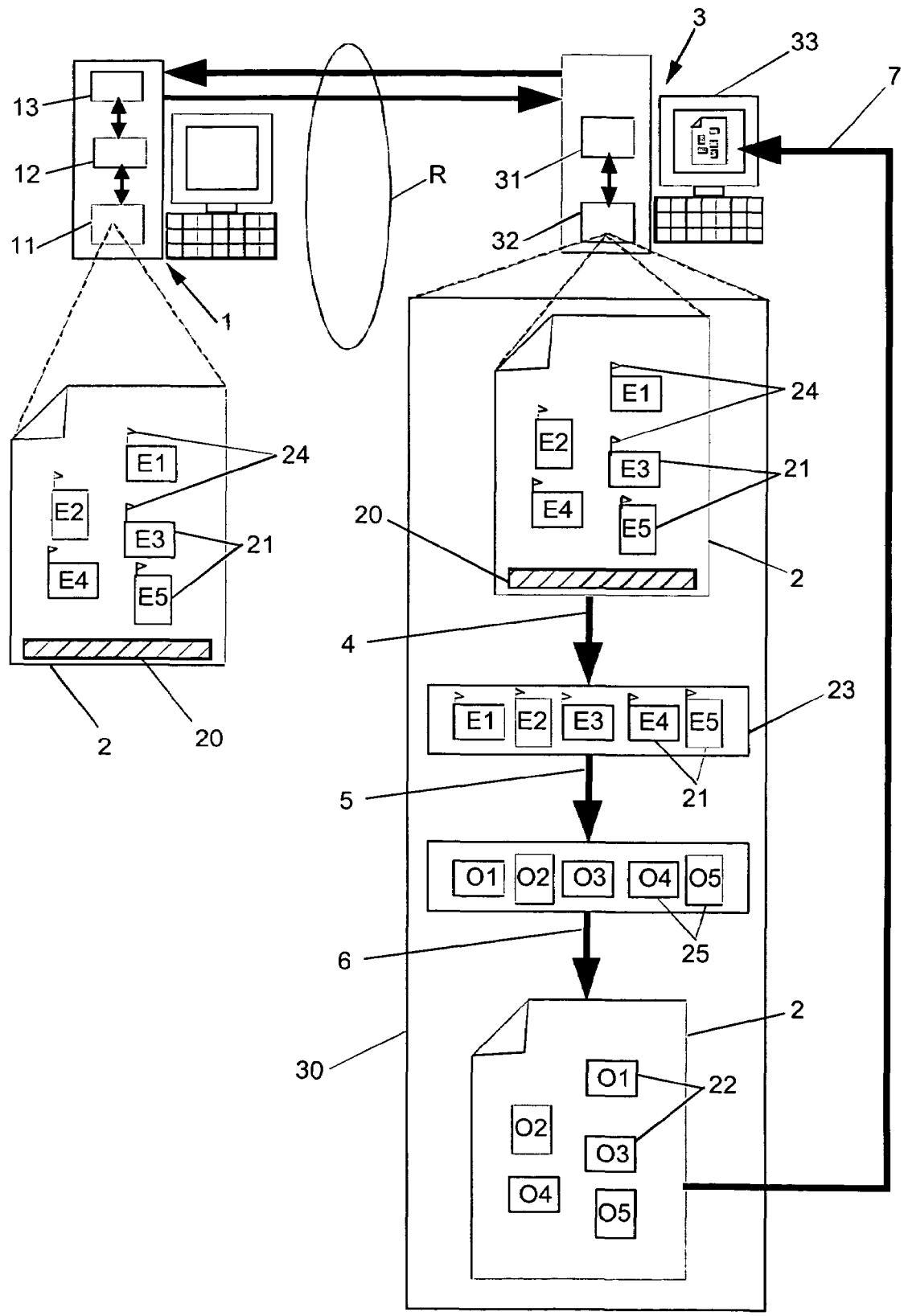

This invention relates to a recognition and referencing process for access to dynamic objects (22) corresponding to dynamic elements (21) contained in Internet pages (2), due to the presence of a script (20) within these pages (2) that can be interpreted and executed by different types of known browsers (30) to implement different steps in the process. This invention also relates to a system enabling implementation of steps in the process according to the invention. Not all existing types of browsers (30) automatically recognise the dynamic elements (21) present in the Internet pages (2) designed using recent programming languages. Therefore the dynamic objects (22) to which these elements (21) refer are not directly accessible and cannot be manipulated in object programming by all types of browsers (30). This limitation of some browsers (30) often obliges Internet site designers to design several versions of the same Internet pages so that one of the versions can be sent to users depending on the type of browser (30) executed by their computer (3). Other designers choose to define a variable for each dynamic element (21) present in the page, so as to define a reference that will enable use of the corresponding dynamic object (22) when the page is loaded by the different browser types. These two solutions cause a loss of a time for Internet site designers who usually prefer to use the most recent programming tools to design elegant pages practical in use, using functions made possible by recent technologies.

The invention enables designers to actually design their Internet site using the most recent tools without being concerned with the limitations of users' browsers (30). For example, designers will simply include the script (20) necessary to implement some steps of the process according to the invention in their Internet pages (2) containing dynamic elements (21) which represents a considerable time saving.

In other variant embodiments, the script (20) is not provided directly to Internet site designers directly, but the process requires the page server computer to send a script access request (20) to a script server computer provided with memory means in which the script (20) is stored. Depending on the source of the script access request, the script server computer (1) may or may not authorise access to the script (20) in its memory means using access authorisation means (12), or it may send the script to the requesting computer using the Internet communication means of the script server computer. Another possibility is for the page server computer to send Internet pages (2) in which the script (20) is to be inserted to the script server computer, so that the script server computer (1) itself does the insertion using its processing means (13), and sends the Internet pages thus completed with the script to the page server computer. The page server computer can then send the pages thus completed to the browsers (30) of users requesting viewing of Internet pages in which the script is to be inserted.

The system enabling implementation of steps in the process according to the invention therefore consists of at least one page server computer, at least one script server computer and at least one user computer. In one variant embodiment shown in FIG. 1, the page server computer is also the script server computer (1) and the script (20) is included in the Internet pages (2) by the processing means (13) of this computer. All these computers have memory means, processing means and Internet communication means. These different means of computers may be constrained to operate according to the chosen embodiment.

For more clarity, the following description only applies to the variant embodiment of the process in which the page server computer inserts the script (20) directly into the Internet pages (2) containing the dynamic elements (21). In this description, we will consider that designers can access this script (20) and insert it in all pages (2) containing the dynamic elements (21) requiring the script (20) for referencing of dynamic objects (22) regardless of which browsers (30) are used by users viewing these pages (2). The script (20) may be stored in the memory means (11) of a page server computer (1) and made accessible on the Internet network (R) by means of an hypertext link, for example of the URL (Universal Resource Locator) type in each page (2) in which it has to be inserted. Therefore, this script (20) can be stored in any memory means, provided that it is accessible to the computers (1) that store the Internet pages (2) containing dynamic elements (21) for which some browsers (30) have to execute the script (20). The Internet pages (2) and the script (20) are made accessible on the Internet network (R) by the page server computer (1), due to its access authorisation means (12) to its memory means (11) and Internet page viewing requests made by users' browsers (30) are processed using its processing means (13).

The different types of browsers (30) executed using processing means (32) of users' computers (3) are usually designed to enable interpretation of dynamic objects (22) by means of the presence of the programming source codes for languages defining these objects in the memory means (31) in which information related to the browser (30) is stored in the user's computer (3). One recent example of a language for the execution of dynamic objects (22) is the Jscrip™ language developed by Microsoft®. However, not all browsers (30) have all functions necessary to identify dynamic elements (21) derived from this type of language, within the pages (2) processed by browsers (30). Therefore, although the dynamic objects (22) to which browsers (30) refer are defined in this source code, they will not be automatically accessible in all types of browsers (30). When some browsers, for example like Microsoft's Internet Explorer®, process Internet pages so as to display them using the display means (33) of users' computers (3), they automatically recognise the dynamic elements (21) and instantiate the corresponding dynamic objects (22). Instantiation of objects defined in the Internet page results in the creation of a copy of the defined object and initialisation of variables of this object. In general, an Internet page designer declares an object using the programming language and defines some variables for its initialisation. The designer then adds code lines (in the same programming language) so as to define dynamic display functions that will be executed on the object when the user takes specific actions or with time. In these browsers, declaration of the object in the Internet page with an identifier and a tag are sufficient to make it directly accessible through the browser. These browsers have a sophisticated programming code enabling identification of elements (21) in real time and interpretation of dynamic objects (22) present within the processed Internet pages. Other browsers, for example such as Netscape® or Mozilla™, process all static elements of Internet pages and are capable of performing dynamic processing. However, these browsers are not capable of directly accessing an object declared in the code of the Internet page currently being processed. Therefore, these objects are not directly accessible using their identifier and the tag of each element in the same way as they are with Microsoft's Internet Explorer®, but require a mechanism for access to objects present in the page, by the creation of an access reference to objects enabling the browser to access the referenced objects. Therefore, these browsers require implementation of the process according to the invention, for example as described below. The process according to the invention takes account of known differences between these browsers, and its implementation depends on the type of browser (30) used to view Internet pages (2) containing dynamic elements (21).

A first step in the process consists of inserting a recognition and referencing script (20) for dynamic objects (22) corresponding to these elements, into the Internet pages containing dynamic elements (21). This first step could be carried out according to different variant embodiments described above.

A second step consists of interpreting this script (20) by the browser (30) of the user viewing the page (2) containing this script (20) and the dynamic elements (21) that necessitate it. Programming lines contained in this script (20) will be interpreted using known browsers (30) that possess the source codes necessary to interpret the different functions provided by recent Internet programming languages. Since the script (20) is written in one of these languages, it will be automatically interpreted by the browser (30) using the processing means (32) of the user's computer (3). Execution of the script (20) by the browser (30) results in implementation of the next steps in the process.

The next step in the process consists of performing a test on the type of browser (30) used to view the Internet page (2) in which the script (20) is contained. Not all of the following steps in the process are always necessary depending on the type of browser, as explained above. This step controls whether or not the user's browser (30) will execute the next steps.

The next step in the process consists of automated routing (4) of the Internet page in which the script is contained. This routing (4) is used to find dynamic elements (21) present in the page due to their tags (24) revealing their natures and identifying them due to their identifiers (E1, E2, E3, E4 and E5). This identification consists of searching for all known types of tags defined in the source code of the dynamic elements programming language stored in the memory means (31) of the user computer (3), and checking the presence of such tags (24) in the Internet page (2) currently being processed. For example, these tags (24) may relate to objects (22) such as images, tables, buttons, etc. Each known tag type is reviewed and all dynamic elements (21) encountered during routing of the page are collected in a global element enumeration variable (23). For each tag type (24), the dynamic element (21) identifiers found are used to give a name to the access reference (25) that will be created to enable access to each object (22) corresponding to each of these dynamic elements (21). After this routing (4), the global enumeration variable (23) will contain all dynamic elements (21) identified by their identifier (E1, E2, E3, E4 and E5). This variable then contains information used to create access references (25) pointing to dynamic objects corresponding to these identified elements.

The next step consists of processing (5) the global enumeration variable (23) for dynamic elements (21) of the Internet page (2), by executing a specific method in the programming language for dynamic Internet pages. When this method, for example the "eval" method used in dynamic objects programming languages, is used on the global enumeration variable (23) of dynamic elements, it enables the creation (5) of access references (25) to dynamic objects (22) corresponding to identified dynamic elements (21). Each access reference (25) carries the name of the identifier of each identified element (21) and will be recognised as being a reference to an object (22) defined in the source code of the dynamic objects programming language.

The next step in the process consists of processing (6) the completed Internet page (2) by the creation (5) of access references (25) to dynamic objects (22). During this processing (6), the browser (30) interprets information contained in the page (2) and instantiates dynamic objects (22) contained in it. This instantiation of dynamic objects (22) is done using the source code of the programming language for the dynamic objects (22) and consists of creating a copy of each referenced object (22) and initialising it. This programming language enables different dynamic functions for modifying the display of Internet pages (2) without requiring communication with page server computers (1) through the Internet network (R).

The last step in the process consists of the display (7) of the Internet page with its dynamic objects (22), due to display means (33) and processing means of users' computers (3). Dynamic objects (22) will thus be displayed at the planned location and, depending on their nature, will change during time and/or as a function of the user's actions. Due to the addition of access references (25), the scripts included in the page will be able to interact with dynamic objects by using object programming. Without these access references (25) and instantiation of the corresponding objects (22), this interaction would not have been possible with browsers such as Netscape® or Mozilla™.

Thus, it can be understood that the process used consists of recognition and referencing of dynamic objects (22) in Internet pages (2), enabling identification (4) of dynamic elements (21) present in Internet pages (2), followed by the definition of dynamic objects (22) by the creation (5) of access references (25) to these objects, enabling their instantiation during processing (6) of the Internet page by users' browsers (30), regardless of their type.

During operation, the designer of Internet sites simply inserts a script (20) enabling implementation of some steps in the process, into the Internet pages (2) that he produces or inserts a link into them indicating the access path to the file corresponding to this script (20). When a user of a browser (30) browses on the Internet network (R), he requests viewing of an Internet page (2) containing the dynamic elements (21) and the inserted script (20). During processing of the page (2), the browser (30), regardless of its type, will automatically identify (4) the dynamic elements (21) present in the page and define (5) the references (25) to the corresponding dynamic objects (22) during execution of the script. The objects (22) will thus be automatically made accessible to the browser (30) to enable dynamic modification of the display (7) of the Internet page (2) being viewed, without requiring communication with any page server.

It will obvious to those skilled in the art that this invention enables embodiments in many other specific forms without going outside the scope of the invention as claimed. Consequently, these embodiments must be considered as being for illustration only, but they may be modified within the scope of the attached claims, and the invention must not be limited to the details given above.

What is claimed is:

1. A process for recognition and referencing of dynamic objects in Internet pages made available on an Internet network by at least one page server, for viewing Internet pages using at least one Internet browsing software tool called a browser, executed on processing means of at least one user's computer, comprising firstly of a script server having memory means and a script stored in said memory means, and secondly dynamic elements included in the Internet pages to be interpreted by all types of browsers when said pages are loaded by the user's computer, and to implement a step to test the type of browser used to view the Internet page, for each of the Internet pages viewed by the user's browser, so as to determine whether or not said browser requires implementation of the following steps defined in the script:

automated routing of the Internet page received by the user's computer and identification of the dynamic elements contained in said Internet page, according to tags of a plurality of known dynamic elements stored in memory means of the user's computer;

creation of an access reference to dynamic objects corresponding to identified dynamic elements, due to the user's browser interpreting a source code of the dynamic objects programming language, said source code being stored in the user's computer memory means;

processing of the Internet page by the user's browser and instantiation of the defined dynamic objects; and display of the Internet page by the user's browser with the dynamic objects contained on it by display means and processing means of the user's computer.

2. A process according to claim 1, wherein the steps involved in automatic routing of the received Internet page and identification of the dynamic elements contained in said received Internet page comprises the following steps:

creation and initialization of a global variable for enumeration of the dynamic elements contained in the Internet page;

searching for marking tags and identifiers of the dynamic elements contained in the page and comparison of the marking tags found with a plurality of known tags of the dynamic elements stored in the memory means of the user's computer;

adding of names corresponding to identifiers of the dynamic elements found using the marking tags of the dynamic elements in the Internet page, into a global enumeration variable; and execution of a method for the definition of access references to the dynamic objects corresponding to the dynamic elements referenced in the global enumeration variable, said execution step resulting in creation of the access references to the dynamic objects recognized in the Internet page.

3. A process according to claim 2, wherein the step for definition of access references to the dynamic objects corresponding to the identified dynamic elements comprises execution of a method for processing the global enumeration variable of the identified dynamic elements, resulting in the creation of the access references to the corresponding dynamic objects recognized as being objects defined in the source code of the dynamic objects programming language and interpretable by the browser of the user's computer when the Internet page is displayed.

4. A process according to claim 2, wherein the access references are defined by interpretation of the script and are then used for object programming due to their interpretation by users' browsers using the source code of the dynamic objects programming language, execution of methods of said dynamic objects enabling the different dynamic functions for modification of the display of Internet pages that contain them, and using the display means of the user's computer without necessitating any communication with the page server.

5. A process according to claim 2, wherein the script is included in the Internet pages containing the dynamic elements as a result of the page server adding a universal resource locator (URL) into each of said pages, indicating the access path of a file corresponding to this script in the memory means of the script server.

6. A process according to claim 2, wherein the page server is also the script server computer and said memory means of the script server stores firstly a file corresponding to the script for recognition and referencing of the dynamic objects in the Internet pages in which this script is to be included, the script inclusion step consisting of using the processing means of said page and script server to add a URL indicating the access path of a file corresponding to this script in its own memory means.

7. A process according to claim 2, wherein the page server is a computer other than a computer which serves as the script server and the script is included in Internet pages when a user's browser makes a request to view an Internet page containing dynamic elements, according to the following steps:

sending a request from the page server to the script server through the Internet network, for access to a file corresponding to the script in the memory means of the script server, authorizing access to the file corresponding to the script by access authorization means of the script server, then sending said file by the script server to the page server through the Internet network;

receiving the file by the page server, inclusive of the script in the Internet page requested for viewing by the user's browser, and then sending the Internet page through the Internet network together with the script to the user's computer.

8. A process according to claim 2, wherein the page server is a computer other than a computer which serves as the script server and the script is included in the Internet pages when a user's browser makes a viewing request to view an Internet page containing dynamic elements, according to the following steps:
sending the Internet page in which the script is to be included by the page server computer through the Internet network to the script server computer;
receiving the page sent by the page server computer by the script server computer inclusive of the script in the Internet page due to processing means of the script server computer, and then sending the Internet page together with the script to the page server computer through the Internet network; and
sending the Internet page together with the script by the page server computer to the user's computer, through the Internet network.

9. A process according to claim 1, wherein the access references are defined by interpretation of the script and are then used for object programming due to their interpretation by users' browsers, using the source code of the dynamic objects programming language, execution of methods of said dynamic objects enabling the different dynamic functions for modification of the display of Internet pages that contain them, and using the display means of the user's computer without necessitating any communication with the page server.

10. A process according to claim 1, wherein the script is included in the Internet pages containing the dynamic elements as a result of the page server adding a universal resource locator (URL) into each of these pages, indicating the access path of a file corresponding to this script in the memory means of the script server.

11. A process according to claim 1, wherein the page server is also the script server and said memory means of the script server stores firstly a file corresponding to the script for recognition and referencing of the dynamic objects in the Internet pages in which this script is to be included, the script inclusion step consisting of using the processing means of said page and script server to add a URL indicating the access path of a file corresponding to this script in its own memory means.

12. A process according to claim 1, wherein the page server is a computer other than a computer which serves as the script server and the script is included in Internet pages when a user's browser makes a request to view an Internet page containing dynamic elements, according to the following steps:
sending a request from the page server to the script server through the Internet network for access to a file corresponding to the script in the memory means of the script server,
authorizing access to the file corresponding to the script by access authorization means of the script server, then sending said file by the script server to the page server through the Internet network;
receiving the file by the page server inclusive of the script in the Internet page requested for viewing by the user's browser, and then sending the Internet page through the Internet network together with the script to the user's computer.

13. A process according to claim 1, wherein the page server is a computer other than a computer which serves as the script server and the script is included in the Internet pages when a user's browser makes a viewing request to view an Internet page containing dynamic elements, according to the following steps:
sending the Internet page in which the script is to be included by the page server computer through the Internet network to the script server computer;
receiving the page sent by the page server computer by the script server computer inclusive of the script in the Internet page due to processing means of the script server computer, and then sending the Internet page together with the script to the page server computer through the Internet network; and
sending the Internet page together with the script by the page server computer to the user's computer, through the Internet network.

14. A process for recognition and referencing of dynamic objects in Internet pages made available by at least one page server in an Internet network for viewing Internet pages using at least one Internet browser, the process being executed by a processor of at least one user's computer, and comprising:
testing the browser used to view the Internet page for each of the Internet pages viewed by the user; and
determining whether the browser requires implementation of a method defined in a script stored in a memory of a script server, the method including:
(a) automatic routing of the Internet page received by the user's computer, and identification of dynamic elements contained in the Internet page according to tags of a plurality of known dynamic elements stored in a memory of the user's computer;
(b) creating access references to dynamic objects corresponding to dynamic elements identified by the user's browser interpreting a source code of the dynamic objects programming language, the source code being stored in the memory of the user's computer;
(c) processing of the Internet page by the user's browser and instantiation of the dynamic objects; and
(d) displaying of the Internet page containing the dynamic objects on a display of the user's computer.

15. A process according to claim 14, wherein the automatic routing of the received Internet page and the identification of the dynamic elements contained in the received Internet page comprises:
creating and initializing a global variable for enumeration of the dynamic elements contained in the Internet page;
searching for marking tags and identifiers of the dynamic elements contained in the Internet page and comparing the marking tags found with a plurality of known tags of the dynamic elements stored in the memory of the user's computer;
adding names corresponding to the identifiers of the dynamic elements found using the marking tags into a global enumeration variable; and
executing a method for defining access references to the dynamic objects corresponding to the dynamic elements referenced in the global enumeration variable, which creates access references to the dynamic objects recognized in the Internet page.

16. A process according to claim 15, wherein the defining access references to the dynamic objects comprises: executing a method for processing the global enumeration variable of the identified dynamic elements, which creates access references to the corresponding dynamic objects recognized as objects defined in the source code of the dynamic objects programming language, the access references being interpretable by the browser of the user's computer when the Internet page is displayed.

17. A process according to claim 15, wherein the script is included in the Internet pages containing the dynamic elements by adding a universal resource locator (URL) indicating an access path of a file corresponding to the script stored in the memory means of the script server into each of the Internet pages by the page server.

18. A process according to claim 15, wherein the page server is also the script server, and the memory of the script server stores a file corresponding to the script for recognition and referencing of the dynamic objects in the Internet pages in which the script is to be included, wherein the script is included in the Internet pages by using a processor of the page and the script server to add a universal resource locator (URL) indicating an access path of a file corresponding to the script stored in the memory of the script server.

19. A process according to claim 15, wherein the access references are defined by interpreting the script, and are used for object programming due to their interpretation by the users' browsers using the source code of the dynamic objects programming language, wherein execution of methods of the dynamic objects enables different dynamic functions for modifying display of the Internet pages that contain the dynamic objects and for using the display of the user's computer without necessitating communication with the page server.

20. A process according to claim 15, wherein the page server is a computer other than a computer which serves as the script server, and when the user's browser makes a request to view the Internet page containing dynamic elements, the script is included in the Internet page according to the following:
  sending a request from the page server to the script server through the Internet network for access to a file corresponding to the script stored in the memory of the script server;
  authorizing access to the file by a script server;
  sending the file from the script server to the page server through the Internet network;
  receiving the file inclusive of the script in the Internet page requested for viewing by the user's browser in the page server; and
  sending the Internet page together with the script through the Internet network to the user's computer.

21. A process according to claim 15, wherein the page server is a computer other than a computer which serves as the script server, and when the user's browser makes a request to view the Internet page containing dynamic elements, the script is included in the Internet page according to the following:
  sending the Internet page in which the script is to be included by the page server to the script server through the Internet network;
  receiving by the script server of the Internet page sent by the page server and including the script in the Internet page by a processor of the script server;
  sending the Internet page together with the script to the page server through the Internet network; and
  sending the Internet page together with the script from the page server to the user's computer through the Internet network.

22. A process according to claim 14, wherein the access references are defined by interpreting the script, and are used for object programming due to their interpretation by the users' browsers using the source code of the dynamic objects programming language, wherein execution of methods of the dynamic objects enables different dynamic functions for modifying display of the Internet pages that contain the dynamic objects and for using the display of the user's computer without necessitating communication with the page server.

23. A process according to claim 14, wherein the script is included in the Internet pages containing the dynamic elements by adding a universal resource locator (URL) indicating an access path of a file corresponding to the script stored in the memory means of the script server into each of the Internet pages by the page server.

24. A process according to claim 14, wherein the page server is also the script server, and the memory of the script server stores a file corresponding to the script for recognition and referencing of the dynamic objects in the Internet pages in which the script is to be included, wherein the script is included in the Internet pages by using a processor of the page and the script server to add a universal resource locator (URL) indicating an access path of a file corresponding to the script stored in the memory of the script server.

25. A process according to claim 14, wherein the page server is a computer other than a computer which serves as the script server, and when the user's browser makes a request to view the Internet page containing dynamic elements, the script is included in the Internet page according to the following:
  sending a request from the page server to the script server through the Internet network for access to a file corresponding to the script stored in the memory of the script server;
  authorizing access to the file by a script server;
  sending the file from the script server to the page server through the Internet network;
  receiving the file inclusive of the script in the Internet page requested for viewing by the user's browser in the page server; and
  sending the Internet page together with the script through the Internet network to the user's computer.

26. A process according to claim 14, wherein the page server is a computer other than a computer which serves as the script server, and when the user's browser makes a request to view the Internet page containing dynamic elements, the script is included in the Internet page according to the following:
  sending the Internet page in which the script is to be included by the page server to the script server through the Internet network;
  receiving by the script server of the Internet page sent by the page server and including the script in the Internet page by a processor of the script server;
  sending the Internet page together with the script to the page server through the Internet network; and
  sending the Internet page together with the script from the page server to the user's computer through the Internet network.

* * * * *

UNITED STATES PATENT AND TRADEMARK OFFICE
CERTIFICATE OF CORRECTION

| | | |
|---|---|---|
| PATENT NO. | : 7,627,813 B2 | Page 1 of 1 |
| APPLICATION NO. | : 11/097368 | |
| DATED | : December 1, 2009 | |
| INVENTOR(S) | : Roser | |

It is certified that error appears in the above-identified patent and that said Letters Patent is hereby corrected as shown below:

Column 10 – Line 29, delete "claim 2" and insert --claim 1--.
Column 10 – Line 39, delete "claim 2" and insert --claim 1--.
Column 10 – Line 45, delete "claim 2" and insert --claim 1--.
Column 10 – Line 54, delete "claim 2" and insert --claim 1--.
Column 11 – Line 6, delete "claim 2" and insert --claim 1--.
Column 11 – Line 24, delete "claim 1" and insert --claim 2--.
Column 11 – Line 34, delete "claim 1" and insert --claim 2--.
Column 11 – Line 40, delete "claim 1" and insert --claim 2--.
Column 11 – Line 49, delete "claim 1" and insert --claim 2--.
Column 12 – Line 2, delete "claim 1" and insert --claim 2--.
Column 13 – Line 4, delete "claim 15" and insert --claim 14--.
Column 13 – Line 10, delete "claim 15" and insert --claim 14--.
Column 13 – Line 19, delete "claim 15" and insert --claim 14--.
Column 13 – Line 29, delete "claim 15" and insert --claim 14--.
Column 13 – Line 47, delete "claim 15" and insert --claim 14--.
Column 14 – Line 1, delete "claim 14" and insert --claim 15--.
Column 14 – Line 11, delete "claim 14" and insert --claim 15--.
Column 14 – Line 17, delete "claim 14" and insert --claim 15--.
Column 14 – Line 26, delete "claim 14" and insert --claim 15--.
Column 14 – Line 44, delete "claim 14" and insert --claim 15--.

Signed and Sealed this

Sixteenth Day of March, 2010

David J. Kappos
*Director of the United States Patent and Trademark Office*